J. S. McL. NICHOLSON.
GAGE FOR BEVELS, MITERS, AND THE LIKE.
APPLICATION FILED SEPT. 6, 1919.
1,346,050.
Patented July 6, 1920.
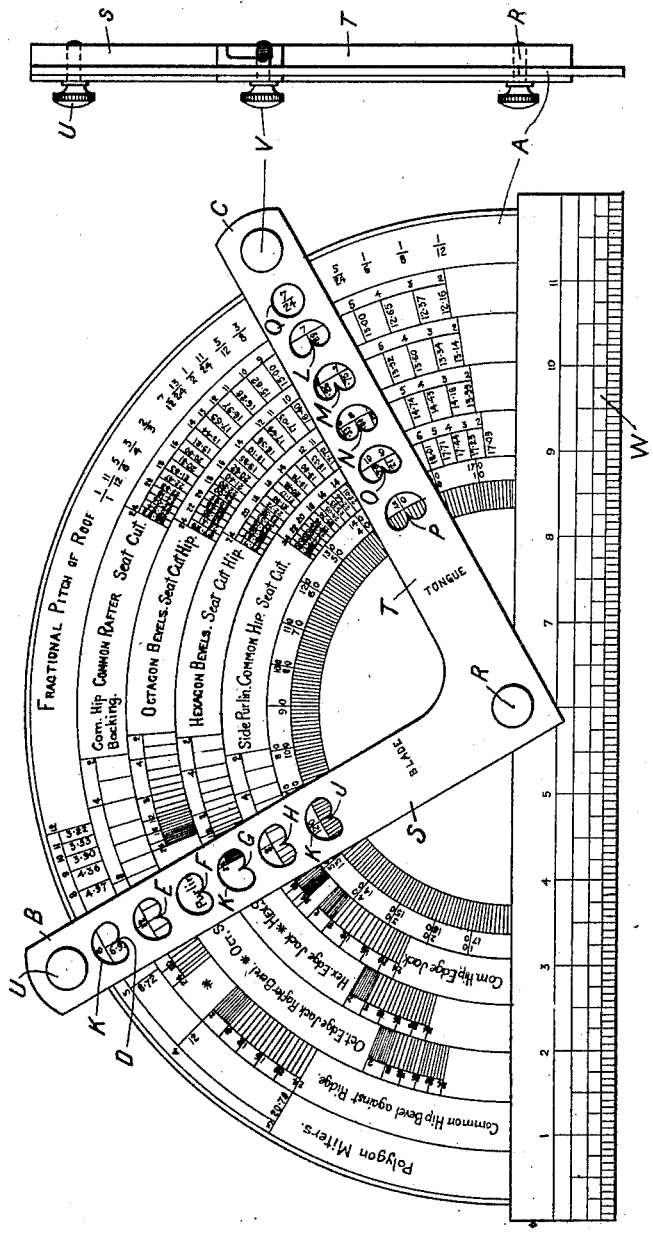
Inventor.
John S. M. Nicholson
by Wilkinson & Giusta.
Attorneys.

UNITED STATES PATENT OFFICE.

JOHN SHAW McLUCKIE NICHOLSON, OF DURHAM, ENGLAND.

GAGE FOR BEVELS, MITERS, AND THE LIKE.

1,346,050.  Specification of Letters Patent.  Patented July 6, 1920.

Application filed September 6, 1919. Serial No. 322,143.

*To all whom it may concern:*

Be it known that I, JOHN SHAW MC-LUCKIE NICHOLSON, a subject of the King of Great Britain, of Holmlea, Barnard Castle, Durham, England, have invented a new and useful Improved Gage for Bevels, Miters, and the like, chiefly designed for use in the construction of roofs, of which the following is a specification.

This invention relates to an improved gage for bevels, miters and the like, and useful for example, for determining the angles to which the ends of the several members of a roof of any given pitch should be cut, in order to fit against the adjacent members, and also for determining the lengths of such members.

According to my invention, I provide a semicircular scale plate having two series of concentric scales about the common center to which there is pivoted the angle of a square or pair of flat bars or arms, which are arranged at right angles to each other, and which serve as indicators. For this purpose each of these arms or bars is provided with a series of apertures having pointers formed therein, and each pointer is arranged to register with the graduations of a scale on the scale-plate, so that there is a concentric series of scales corresponding to each arm or bar.

On the other or rear side of the scale-plate there is arranged another similar square or pair of arms at right angles to each other, which are connected by set-screws to the corresponding indicator arms, and which consequently revolve with the same. These rear arms form fences which can be placed against the wood or other material so as to enable the latter to be suitably marked for cutting. When the arms have been adjusted to the required positions the set-screws are tightened up so as to hold the arms in such positions during the marking.

The gage may be made of sheet steel, wood, or other suitable material.

In the accompanying drawing:—

Figure 1 is a front view of a gage constructed according to my invention, and

Fig. 2 a side or edge elevation thereof.

In the gage shown, A is the scale plate and B, C, are the indicator-arms. Of these the arm B may be termed the blade and the other C, the tongue, the arm B being provided with a series of pointers, D, E, F, G, H, J, arranged in apertures cut in the arm, and the arm C with a series of similarly arranged pointers, L, M, N, O, P and a window Q.

The pointers J, P, move over a scale graduated in degrees, so as to indicate to what angles the gage arms are set in each particular case.

The indicator arms, B, C, are made integrally with each other so as to form a square pivoted to turn about the screw pin R which also forms the pivotal axis of a pair of fence-arms, S, T which are integral with each other and are connected to the arms B, C respectively by clamping screws U, V. W is a straight edge extending across the base diameter of the semi-circular arc and serving as the edge whereby the cut to be made is scribed on to the timber.

In the example shown, the scales are constructed as follows:—

The window Q, in the indicator-tongue C registers with a series of numbers indicating the required pitch of the roof expressed as a fraction (*i. e.* the height divided by the span of the roof). Opposite the nearest pointer L, there is a series of index or guide numbers corresponding to these fractions. This index or guide number which is always shown between the seat cut of common rafter and the fractional pitch of roof is used to find the angles of the ends of the several members of the roof by setting the several pointers to this number on the corresponding scales. By then placing the fence-arm immediately beneath the pointer in use for the time being against the timber, the angle of the cut marked is given by the straight edge W. If such cut be the seat cut, and the fence used be the tongue-fence T, the plumb cut will be given by the straight edge W if the fence S be placed against the timber.

If for example the window be set to roof pitch 7/24, as shown in Fig. 1, the guide number opposite the pointer L will be found to be "7." The fences will then be set for the bevels of the common rafters, the tongue-fence T being used when scribing the seat-cut and the blade-fence S when scribing the plumb cut in each case by means of the straight edge W. For octagon, hexagon or common hip bevels the pointers M, N, O are set to the number "7" on the respective scales, the tongue-fence T then being used when scribing the seat cut and the blade-fence S when scribing the plumb cut in each case.

Opposite the index or guide number on each scale there is given a number which, when multiplied by half the span of the building in feet, gives the length along the center line of the top edge of the common rafter, or the octagon, hexagon, or common hip or valley rafter as the case may be. To obtain the bevel of the common hip rafter against the ridge-board, the blade pointer E is set to "7" on the respective scale and the bevel is obtained at the scribing edge W by placing the gage on the top surface of the hip rafter with the blade-fence S against the timber.

The pointer E when brought into register with the number "7" on the scale marked "Common hip backing," enables the required bevel to be obtained when the blade-fence S is applied to the edge of the timber. Side purlin bevels for either octagon, hexagon, common or valley purlins for this pitch of roof can be obtained by setting the pointers F, G, H to the number "7" on the respective scales. As regards the edge jack rafter and edge purlin bevels, since these two roof members are at right angles to each other in plan, one setting of the gage supplies both bevels. The edge jack rafter bevel to fit against the common hip is given by setting pointer H, the edge jack to fit against the hexagon hip is obtained by setting pointer G, and the edge jack to fit against octagon hip is obtained by setting pointer F, to number "7" on the respective scale.

The pointer D on the blade B gives the miters for constructing polygons with from 3 to 12 sides. This scale also gives the length of side of the respective polygon with an inscribed diameter of one foot.

By multiplying this number for the polygon of the desired number of sides by the number of feet in the inscribed diameter, the length of side of such polygon will be obtained.

What I claim as my invention and desire to secure by Letters Patent is:—

1. A gage comprising a semicircular scale-plate which has a straight edge along its base-chord and has on one side a series of concentric scales, indicator-arms connected to form a square, the angle of which is pivotally connected to said plate at the center of the concentric scales, pointers on said indicator-arms registering with the graduations of said scales, fence-arms connected to form a square the angle of which is pivotally connected to the other side of the scale-plate about the same center as the indicator-arms, and means for clamping the indicator and fence-arms to one another and to the scale-plate for the purposes specified.

2. A gage comprising a semicircular scale-plate which has a straight edge along its base-chord and has on one side a series of concentric scales, indicator arms connected to form a square the angle of which is pivotally connected to said plate at the center of the concentric scales, pointers on said indicator-arms registering with the graduations of said scales, fence-arms connected to form a square the angle of which is pivotally connected to the other side of the scale-plate about the same center as the indicator-arms, and clamping screws connecting said indicator arms and said fence-arms.

3. A gage comprising a semicircular scale-plate which has a straight-edge along its base-chord and has on one side a series of concentric scales, indicator-arms connected to form a square, the angle of which is pivotally connected to said plate at the center of the concentric scales, said indicator arm having apertures, pointers on said indicator-arms, said pointers being formed in apertures in the indicator-arms and registering with the graduations of said scales, fence-arms connected to form a square the angle of which is pivotally connected to the other side of the scale-plate about the same center as the indicator-arms, and means for clamping the indicator and fence-arms to one another and to the scale-plate, for the purposes specified.

JOHN SHAW McLUCKIE NICHOLSON.